Dec. 5, 1939.  J. R. KOVAR  2,182,260

HARROW CONTROL DEVICE

Filed Feb. 5, 1937  2 Sheets-Sheet 1

Inventor
JOHN R. KOVAR
By Chas. C. Reif
Attorney

Dec. 5, 1939.  J. R. KOVAR  2,182,260

HARROW CONTROL DEVICE

Filed Feb. 5, 1937  2 Sheets-Sheet 2

Inventor
JOHN R. KOVAR
By
Chas. C. Reif.
Attorney

Patented Dec. 5, 1939

2,182,260

UNITED STATES PATENT OFFICE 2,182,260

HARROW CONTROL DEVICE

John R. Kovar, Anoka, Minn.

Application February 5, 1937, Serial No. 124,211

14 Claims. (Cl. 55—34)

This invention relates to a harrow and while the same might be applicable to different types of harrows and other similar implements having oscillating teeth movable in the ground, in the embodiment of the invention illustrated it is shown as applied to the well known spring tooth harrow.

In one common type of spring tooth harrow there is present a frame and a plurality of shafts are mounted in this frame for oscillation or rotation therein, which shafts carry the teeth. Said teeth are of curved or partly circular form having pointed ends which travel in the ground in the operation of said harrow, said teeth usually having considerable resiliency. It is the common practice to have a member extending transversely of said shafts and connected thereto for oscillating said shafts and moving said teeth to inoperative and operative positions. This member has commonly been controlled or operated by a hand lever having a hand operated pawl engageable with a fixed tooth segment. Such a construction has operated very satisfactorily where the driver of the traction means for the harrow can conveniently go back to the harrow and move the teeth to inoperative position. It has been found, however, that when a harrow comprising one or more sections is being drawn by a tractor that occasion often arises making it desirable to move the teeth to inoperative position without stopping the movement of the tractor. Thus if the tractor goes into a soft spot and the operator must stop the tractor and go back to move the harrow teeth to inoperative position, the tractor may become mired or slip in the mud to an objectionable position.

It is very desirable therefore to have a construction by means of which the operator of the tractor can quickly and easily move the teeth to inoperative position and also back to operative position without leaving his position on the tractor. With such a construction the load can be quickly relieved on the tractor when the same begins to sink or slip in soft ground.

It is an object of this invention, therefore, to provide a simple and efficient structure by means of which the teeth on the harrow may be moved to inoperative and operative positions by the operator of the traction means without said operator leaving his position on the traction means.

It is a further object of the invention to provide a spring tooth or similar harrow having oscillating teeth movable to operative and inoperative positions with means for holding the teeth in operative position, means for moving the teeth to inoperative position and means extending to the driver of a traction means pulling the harrow for quickly operating said last mentioned means.

It is a further object of the invention to provide a structure of spring tooth harrow having partly circular oscillatable teeth, which teeth are movable to inoperative and operative positions by rotative movement, means for holding said teeth in operative position, means including a member extending to a point some distance in front of the harrow for moving said teeth to inoperative position and by subsequent operations to move said teeth to positions from which they will be moved to operative position by forward movement of said harrow.

These and other objects and advantages of the invention will be fully set forth in the following description made in connection with the accompanying drawings, in which like reference characters refer to similar parts throughout the several views and in which.

Figure 1:
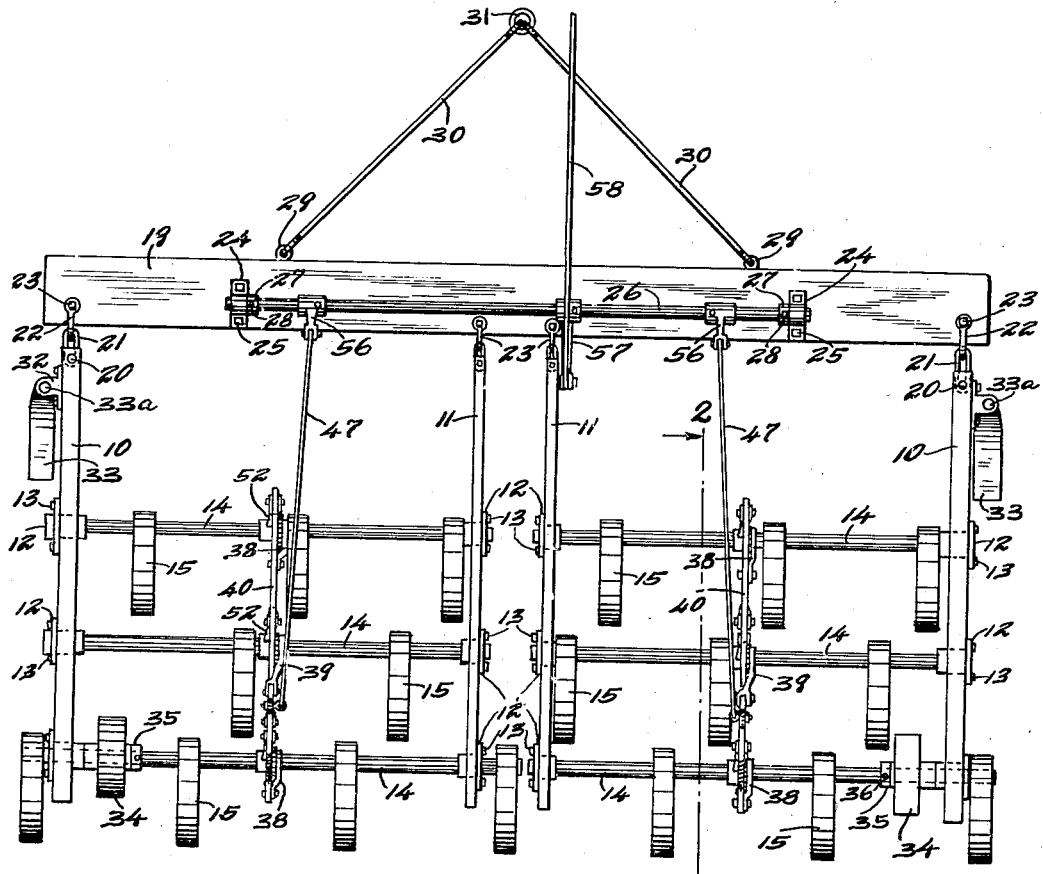
Fig. 1 is a plan view of a spring tooth harrow comprising two sections and equipped with the present invention.
Figure 3:
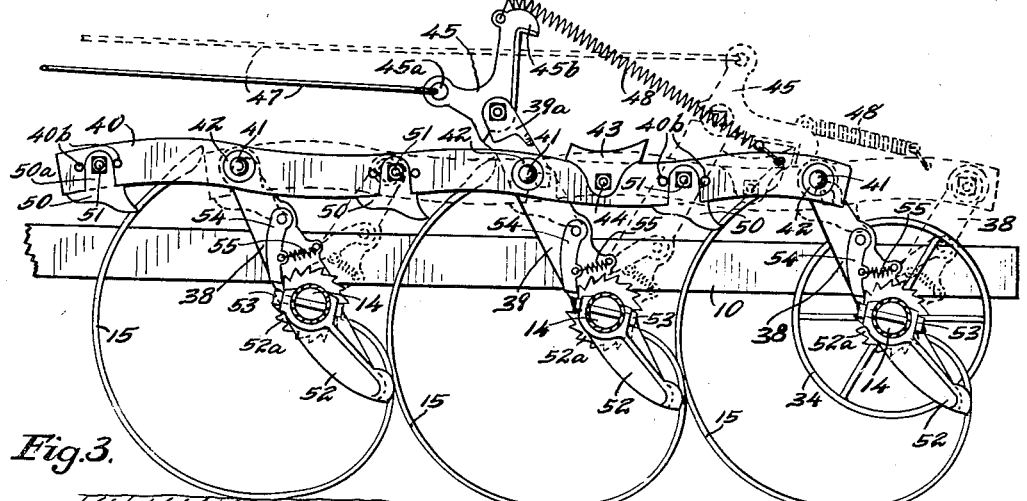
Fig. 3 is a view similar to Fig. 2 showing the teeth moved to position where they will roll in the forward movement of the harrow, some parts being shown in different positions in dotted lines.
Figure 2:
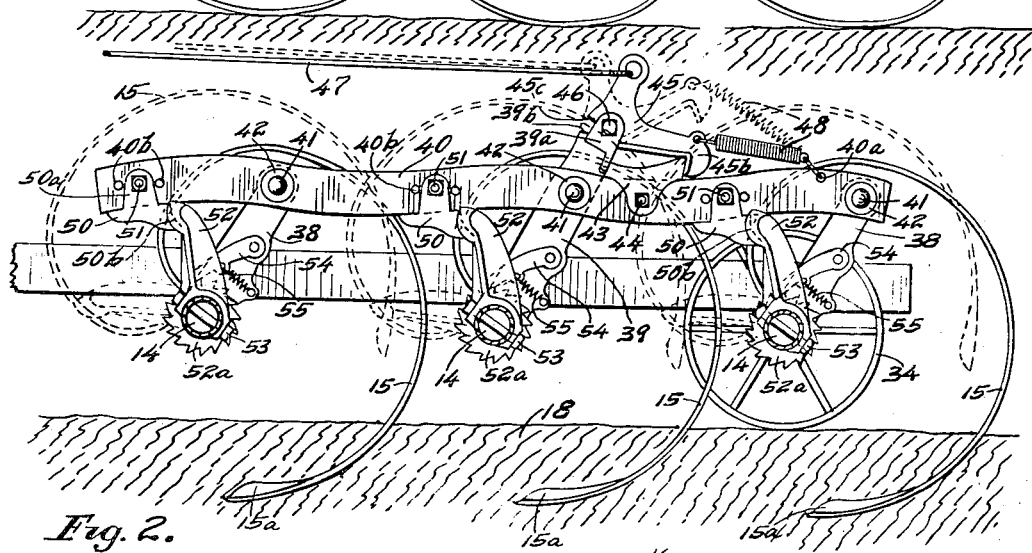
Fig. 2 is a vertical section taken on line 2—2 of Fig. 1 as indicated by the arrows.
Figures 4, 5:
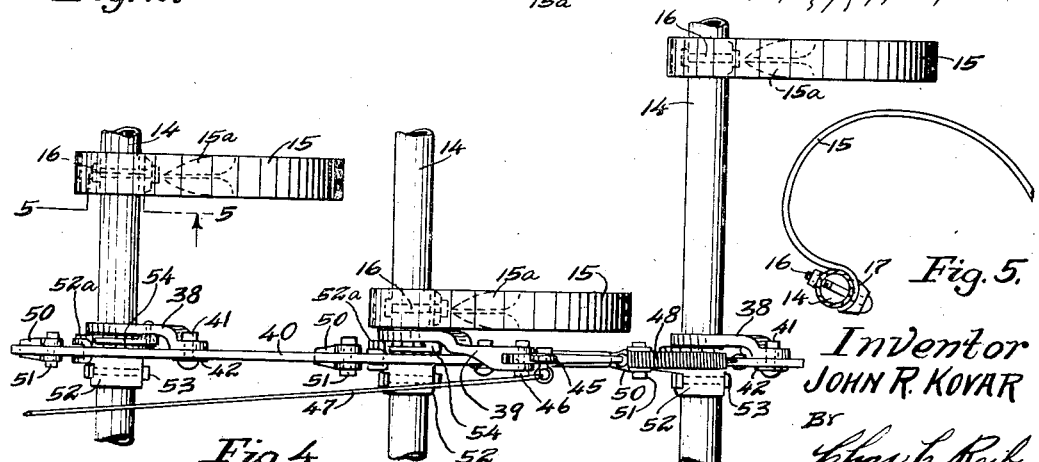
Fig. 4 is a top plan view of Fig. 2.
Fig. 5 is a vertical section taken substantially on line 5—5 of Fig. 4 as indicated by the arrow.

Referring to the drawings, in Fig. 1 a harrow is shown of the type having teeth oscillatable to inoperative and operative positions and while other types of harrows might embody the invention, in the embodiment illustrated a harrow is shown of the spring tooth type. Said harrow is shown as having two sections each of which has a frame comprising side bars 10 and 11. Bearings 12 are carried in said frame and are secured to the outer sides of bars 10 and 11 by bolts or rivets 13. The bars 10 and 11 extend longitudinally of the harrow or in the direction in which it is moved and shafts 14 extend between bars 10 and 11 of each section and are journaled in bearings 12. Each shaft 14 has secured thereto a plurality of teeth 15. These teeth are somewhat of spiral or partly circular shape in side elevation as shown in Figs. 2, 3 and 5 and the same have one end curved about and engaging the shaft 14 and secured thereto by a headed and nutted bolt 16 passing diametrically through shaft 14 and through a small block 17 fitting against the curved portion of the tooth and disposed between the same and the head of bolt 16. The teeth 15 each have a somewhat flattened and pointed free end 15a which moves through the earth or ground 18 in the operation of the harrow. The side members 10 and 11 are swingingly connected to a transverse front bar 19. While they may be connected to bar 19 in various ways, in the embodiment of the invention illustrated bars 10 and 11 are shown as having bolts or rivets 20 extending vertically therein and through a link 21. Link 21 is engaged in the loop of a clevis 22 swivelly connected to bar 19 by a vertical headed and nutted bolt 23. Bearing brackets 24 are bolted to the top of bar 19 by bolts 25. A shaft 26 is journaled in brackets 24 and held from longitudinal movement therein by collars 27 secured to shaft 26 by pins or set screws 28. Eye-bolts 29 are shown as secured in the front side of bar 19, which bar is shown as made of wood and rods 30 have eyelets at their ends engaged respectively in the eyelets of bolts 29, which rods 30 extend forwardly and have eyelets at their ends engaged through a ring 31. The traction means for the harrow will be connected to ring 31. The bars 10 have secured to their outer sides adjacent their front ends brackets 32 having vertical apertures therein in which are disposed and journaled vertical standards 33a of runners 33. Runners 33 are swingable about the vertical axes of standards 33a and act to support frame members 10 and 11 above the ground. The rear shafts 14 have journaled thereon wheels 34. Collars 35 are secured to shafts 14 by pins or set screws 36 holding wheels 34 in place. Wheels 34 support the frame or bars 10 and 11 above the ground at the rear ends thereof.

Each shaft 14 has swingably mounted thereon, preferably adjacent its central portion as shown, an arm, which arms are designated 38 and 39. Arms 38 and 39 are each pivotally connected to a bar 40 by headed and nutted bolts 41, which bolts are shown as having washers 42 respectively disposed between their heads and the side of bar 40. Bar 40 extends parallel to members 10 and 11 above shafts 14 and is shown as somewhat sinuous in form as seen in Figs. 2 and 3. Arm 39 extends beyond or above the bar 40 and is formed with a stop lug 39a on one side adapted to engage against the end of a stop block or member 43 rigidly secured to bar 40 and having lugs extending downwardly at each side of said bar and connected thereto by the headed and nutted bolt 44. Arm 39 is bifurcated at its upper end and has disposed between the sides thereof an arm 45 shown as of bell crank form and pivotally connected to arm 39 by a headed and nutted bolt 46. One arm of member 45 extends upwardly and is provided with an aperture 45a in which one end of a pulling member 47 is secured. While member 47 might sometimes take the form of a flexible member or cable, in the embodiment of the invention illustrated it is shown as a small rod. The other arm of member 45 is shown as having a hook or latch 45b at its end formed with an angle at its inner side of approximately 90 degrees or slightly less and the same is adapted to engage over the angular rear end of member 43 disposed somewhat above the top of bar 40. A coiled tensile spring 48 is secured to the hook portion 45b and is secured at its other end in an aperture 40a formed in the bar 40 some distance to the rear of member 43. It will be noted that arm 39 is formed with a flat transverse surface 39b adjacent its upper end and that the lower side of the upwardly extending portion of member 45 is formed with a flat surface 45c adapted to engage with surface 39b when member 45 is pulled forwardly by member 47. Bar 40 also has secured thereto a plurality of lugs or stop members 50, the same having portions 50a disposed at either side of bar 40 and secured thereto by headed and nutted bolts 51. Bolts 51 may extend through any one of a plurality of holes 40b so that members 50 may be secured in different positions. Members 50 engage the lower edge or bottom of bar 40 and at their rear sides have concave stop surfaces 50b. The surfaces 50b are adapted to be engaged by the slotted or bifurcated upper ends of arms 52 which have hubs through which the shafts 14 pass. Said arms are secured to shafts 14 by the headed and nutted bolts 53. Arms 52 have formed thereon at their sides adjacent bar 40 ratchet wheels 52a. Ratchet wheels 52a are adapted to be engaged by pawls 54 pivotally mounted on one side of arms 38 and 39 respectively, said pawls being urged downwardly so that their ends engage ratchets 52a by small tensile springs 55 secured at one end to pawls 54 and at their other ends to arms 38 and 39 respectively. As shown in Figs. 2 and 3 there is one member 50 and one member 52 for each of the shafts 14. If the harrow comprised only one section, member 47 could be a cable extending to the operator of the tractor or other traction means for the harrow. Where a plurality of sections of harrow are used as shown in Fig. 1, the rods 47 are connected to arms 56 secured to shaft 26. Another arm 57 is secured to shaft 26 between arms 56 and arm 57 has connected to its outer end a flexible member or cable 58 which will extend to the operator of the tractor or other traction means for the harrow.

Figures 6, 7, 8:
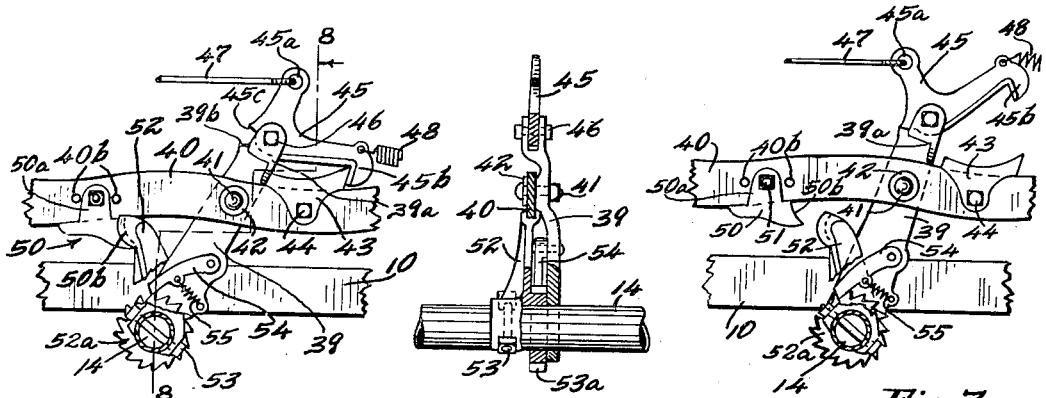
Fig. 6 is a partial view similar to Fig. 2, some parts being broken away.
Fig. 7 is a view similar to Fig. 6 showing the parts in a different position.
Fig. 8 is a vertical section taken substantially on line 8—8 of Fig. 6 as indicated by the arrow.

In operation, the harrow will be drawn over the field by a tractor or other traction means secured to ring 31. When in operative position the teeth 15 will occupy the positions shown in Fig. 2. At this time arms 52 are in engagement with the stop members 50 as shown in Fig. 2. Portion 45b is hooked over the rear end of member 43. The teeth 15 are thus locked in operative position. The pull on the teeth due to being drawn through the ground tends to rotate the teeth and shafts 14 to move arms 52 forwardly or in a counter-clockwise direction as shown in Fig. 2. Arms 52 engage stops 50 and tend to move bar 40 forwardly. If bar 40 could swing upwardly in an arc it could move forwardly and swing arms 38 and 39. However, due to the member 45 engaging member 43 this movement is prevented and bar 40 is thus locked in position and locks teeth 15 in position. The harrow can thus be drawn through the ground in operative position. Should the operator of the traction means for some reason wish to release the load on the harrow and move the teeth to inoperative position, he will merely pull on the cable 58. It will be noted that with the teeth in operative position and with arms 52 engaging members 50 that the pawls 54 are not engaging a tooth of the ratchets 52a as shown in Fig. 6. The first result of pulling on cable 58 is to move rods 47 through arm 57, shaft 26 and arms 56 and thus swing member 45 about its pivot bolt 46. Arm 45 thus moves to the position shown in Fig. 7 against the tension of spring 48 and hook 45b is released from member 43. Surfaces 39b and 45c come into engagement and arm 39 and arms 38 are swung forwardly or in a counter-clockwise direction. Pawls 54 come into engagement with the teeth of ratchets 52a as shown in Fig. 7 and bar 40 moves forwardly sufficiently before said pawls so engage said ratchets that clearance is provided for arms 52 to swing past the stop members 50. Arm 39 continues to move forwardly under the pull of members 47 as shown in Fig. 3 and this arm and arms 38 through the pawls 54 oscillate the ratchets 52a and thus turn shafts 14, swinging the teeth 15 to inoperative position as shown in dotted lines in Fig. 2, said teeth then having their free ends some distance above the ground. The teeth will remain in this position and the load has thus been released from the harrow and the operator of the traction means can manipulate the traction means without the load influencing the same. There is sufficient friction between the parts to hold the teeth in inoperative position and the teeth are nearly balanced over the shaft 14 when in inoperative position so that there is no tendency for the teeth to move further forward. If a tractor is being used and it begins to slip or sink into soft ground the load can be quickly released and the tractor guided or accelerated as desired to prevent trouble. When the operator wishes to again move the teeth 15 to operative position he gives one or more pulls on cable 58 and this acts to further rotate ratchets 52a and thus the teeth 15 until the teeth come into the position shown in Fig. 3 with their convex surfaces engaging the ground. As the harrow is drawn forwardly with the teeth in this position they will roll on the ground due to the weight of the harrow and overcome the frictional resistance to rotation of shafts 14 and will turn shafts 14. The arms 52 will rotate with shafts 14 and the teeth and when the arms 52 come slightly past the vertical they will again engage with members 50. The operator has previously released the tension on cable 58 and spring 48 has swung arm 45 rearwardly or in a clockwise direction so that portion 45b again hooks over the rear end of member 43. As arms 52 come around, therefore, and engage members 50 the teeth arrive at and are locked in operative position as previously described. The teeth have therefore been controlled entirely from the operator's position on the traction means without him leaving his position. The teeth can be quickly moved to inoperative position as described and when the operator desires he can readily move them to operative position. The operator can, of course, give as many operations as he desires to cable 58 just so he releases this to permit engagement of members 45 and 43 before arms 52 engage members 50.

From the above description it is seen that applicant has provided a very simple and efficient structure whereby a spring tooth harrow or similar device can be manipulated entirely from the operator's position on the traction means to move the teeth to inoperative or operative position.

Spring tooth harrows have been used in very large numbers in this country, particularly the western, middle western and northwestern states. These harrows have as previously stated come under the objection of having only the manually operated control for the teeth thereon which had to be manipulated at the harrow. When a tractor is being used some distance ahead of the harrow it was often objectionable as above explained for the operator to stop the tractor and go back to the harrow to adjust the teeth. With the present invention this objection has been overcome. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:

1. A harrow structure having in combination, a frame, a plurality of shafts mounted for rotative movement in said frame, teeth of curved hook form in side elevation secured to said shafts and having pointed ends adapted to travel through the ground, arms respectively journaled on said shafts, a member connected to said arms for simultaneously swinging the same, ratchet wheels connected to said shafts, pawls carried respectively by said arms for engaging said ratchet wheels, stop arms carried by said shafts, lugs on said member engageable by said stop arms, a swinging member connected to one of said arms and having latching engagement with said member to prevent movement thereof and thus lock said teeth in operative position, a flexible member extending from said swinging member to a point some distance in front of said harrow for swinging said swinging member, releasing the same from said first mentioned member and moving said first mentioned member and said arms to oscillate said shafts and move said teeth to inoperative position.

2. In combination with a harrow having rows of spring teeth partly circular in side elevation, means extending forwardly from the harrow and manipulatable by an operator some distance in front of said harrow, mechanism connected to and operated by the first manipulations of said means for positively oscillating said teeth to inoperative position and operated by subsequent manipulations of said means for positively oscillating said teeth in the same direction into engagement with the ground so that they will move to operative position by rolling on the ground in the forward movement of said harrow and means for holding said teeth in operative position.

3. A harrow construction having in combination, a frame, a plurality of substantially parallel shafts journaled in said frame, teeth carried on said shafts, arms swingably mounted on said shafts, means on said arms and shafts for intermittently rotating said shafts in the swinging movement of said arms, a member connected to all of said arms and movable to swing said arms, a swinging member pivoted to one of said arms and having a portion arranged to be brought into latching engagement with said first mentioned member, means normally urging said first mentioned swinging member into said latching engagement and means extending to a point some distance in front of said harrow to operate said swinging member, move the same to unlatched position and then move said first mentioned member to positively rotate said shafts and move said teeth to inoperative position.

4. A harrow construction having in combination, a frame, a plurality of substantially parallel shafts journaled in said frame, teeth carried on said shafts, arms mounted on said shafts for swinging movement relative thereto and constructed and arranged to positively rotate said shafts and move said teeth to inoperative position, a member connected to all of said arms for oscillating the same, an operating member pivoted to one of said arms and having spring controlled latching engagement with said first mentioned member and means for actuating said operating member to release the same and move said first mentioned member to move said teeth to inoperative position.

5. A harrow structure having in combination, a frame, a plurality of substantially parallel shafts journaled in said frame, spaced teeth carried on each of said shafts, arms oscillatable on each of said shafts, a bar connected to all of said arms for simultaneously moving the same to oscillate said shafts and move said teeth to inoperative position, one of said arms extending above said bar, a member pivoted to said last mentioned arm above said bar and having latching engagement with said bar, a spring for moving said member into latching engagement, means on said arms and shafts for intermittently and positively rotating said shafts upon oscillation of said arms and a member connected to said member and extending to a point some distance in front of said harrow for operating said last mentioned member to release it from said bar and then move said bar to move said teeth to inoperative position.

6. The structure set forth in claim 5, said teeth being of curved form and movable into rolling engagement with the ground by subsequent operations of said last mentioned member, said teeth being movable to operative position by friction on the ground in the forward movement of said harrow and stop means for said teeth when they reach operative position, said first mentioned member then coming into latching engagement with said bar.

7. A harrow structure having in combination, a frame, a plurality of rows of teeth carried in said frame, means for holding said teeth in operative position, means extending to a point some distance in front of said harrow, and means on said frame for releasing said teeth and for positively moving said teeth to inoperative position connected to said second mentioned means and operated by pulls thereon, said last mentioned means acting to positively further move said teeth to a position in contact with the ground by subsequent pulls upon said second mentioned means.

8. A harrow structure having in combination, a frame, a plurality of shafts extending transversely of said frame and mounted for rotative movement therein, spaced teeth of general semicircular form carried on each of said shafts, means for holding said shafts in position with said teeth in operative position, a swinging member, a member extending some distance in front of said harrow connected to said swinging member, and means operated by said swinging member when said last mentioned member is pulled upon for positively rotating said shafts and moving said teeth in operative position and for positively rotating said shafts further in the same direction by subsequent pulls upon said last mentioned member to move said teeth into position with their convex sides in engagement with the ground.

9. A harrow structure having in combination, a frame, a plurality of shafts extending transversely of said frame and mounted for rotative movement therein, spaced teeth carried on said shafts, means for holding said shafts in operative position with said teeth moving in the ground, a swinging member, a member connected to said swinging member and means operated by said swinging member, when actuated by the operator moving said last mentioned member, for positively rotating said shafts to move said teeth first to inoperative position and then to move them again into contact with the ground.

10. A harrow structure having in combination, a frame, a row of teeth spaced transversely of said frame and rotatably carried therein, means for holding said teeth in operative position, a member extending to a point some distance in front of said harrow and means actuated by movements of said last mentioned member by the operator for positively rotating said teeth to inoperative position and for continuing said rotation by subsequent movements of said last mentioned member by the operator for bringing said teeth into position in engagement with the ground.

11. A harrow structure having in combination, a frame, a plurality of shafts extending transversely of said frame and mounted for rotative movement therein, spaced teeth carried on said shafts, a member extending to a point some distance in front of said harrow, means operated by movements of said last mentioned member by the operator for intermittently and positively rotating said shafts to swing said teeth to inoperative position and for further rotating said shafts to bring said teeth into contact with the ground.

12. A harrow structure having in combination, a frame, a plurality of rows of teeth carried by said frame, a member connected to all of said rows and movable to cause said teeth to inoperative position, a locking means for said member to maintain said teeth in operative position, a member extending to a point some distance in front of said harrow adapted to be actuated to release said locking means and move said first mentioned member to positively move said teeth to inoperative position, resilient means urging said locking means to operative position, said teeth being movable to ground-engaging position by subsequent movements of said last mentioned member and said teeth being constructed and arranged to move to operative position by engagement with the ground in the forward movement of said harrow and means for stopping the movement of said teeth upon reaching operative position, said locking means then becoming operative.

13. In combination with a harrow having a plurality of rows of teeth movable to operative and inoperative positions by an oscillating movement, a member connected to all of said rows and adapted to be moved longitudinally of said harrow for oscillating the teeth in all of said rows to inoperative position, means for holding said member in position with the teeth in operative position, a swinging member connected to said last mentioned member, means connected to said swinging member and extending a distance in front of said harrow to be operated by a person some distance in front of said harrow for swinging said swinging member to release said first mentioned member and then to move the same to oscillate the teeth to inoperative position, said teeth being curved with convex outer sides and rotatable and said first mentioned member being further movable by subsequent operations of said last mentioned means to rotate said teeth and bring the same into rolling engagement with the ground whereby they will move to operative position with forward movement of said harrow and said means for holding said member again becoming operative when said teeth reach operative position.

14. A harrow construction having in combination, a frame, a plurality of rows of teeth carried on said frame, said teeth being movable from operative to inoperative position, means for holding said teeth in operative position, a member movable to release said teeth for movement to inoperative position, means operated by movement of said last mentioned member for moving said teeth to inoperative position and an operating member extending to a point some distance forward of said harrow to be operated from said point to actuate said first mentioned member to move said teeth to inoperative position, said teeth being constructed and arranged to engage the ground and to be moved into engagement therewith by subsequent actuations of said operating member and to be moved to operative position by rolling movement on the ground in the forward movement of said harrow and means for stopping said movement of said teeth when they reach operative position, said first mentioned means then becoming operative to hold said teeth in operative position.

JOHN R. KOVAR.